(No Model.) 2 Sheets—Sheet 1.

A. M. WRIGHT.
RAILWAY ROLLING GEAR.

No. 244,837. Patented July 26, 1881.

Witnesses:
F. B. Townsend
C. C. Linthicum

Inventor:
Abner M. Wright
by P. C. Dyrenforth
Attorney.

N. PETERS, Photo-Lithographer, Washington, D. C.

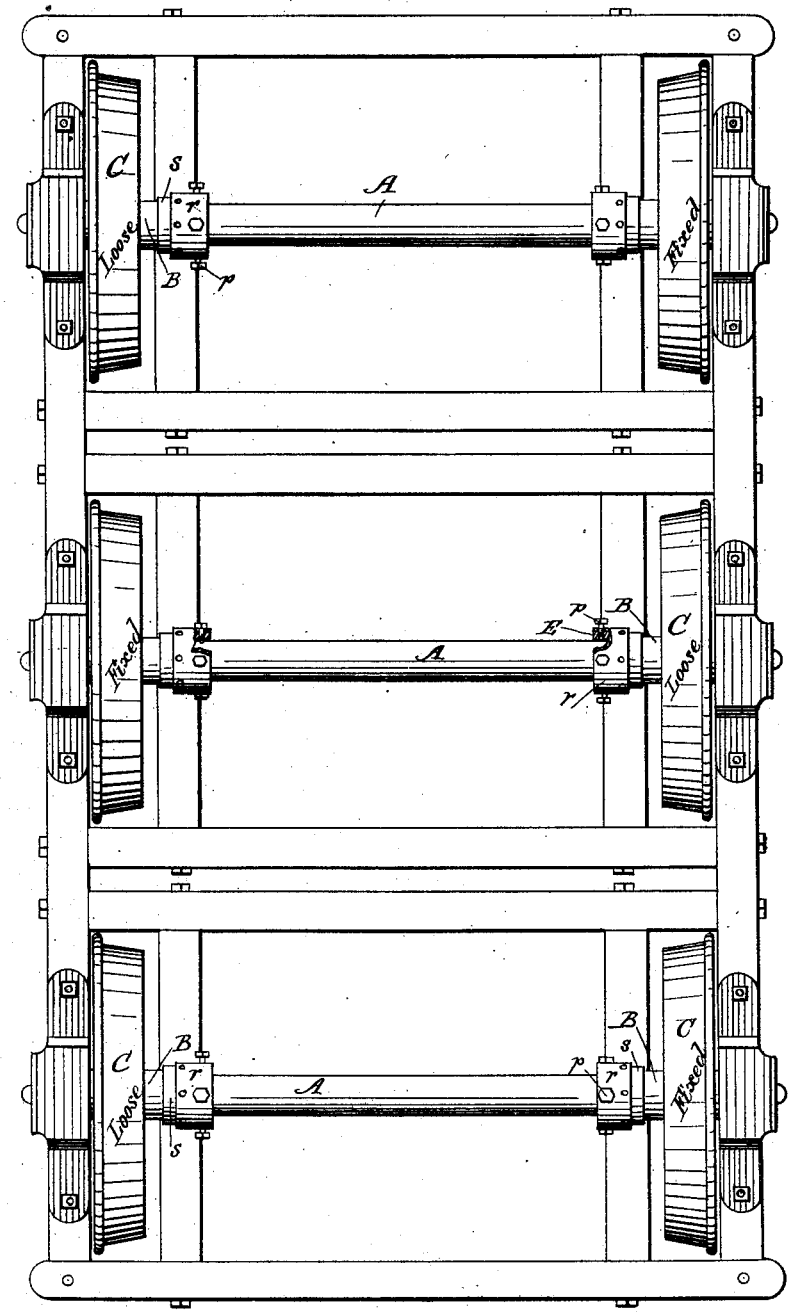

UNITED STATES PATENT OFFICE.

ABNER M. WRIGHT, OF CHICAGO, ILLINOIS.

RAILWAY ROLLING-GEAR.

SPECIFICATION forming part of Letters Patent No. 244,837, dated July 26, 1881.

Application filed February 19, 1881. (No model.)

*To all whom it may concern:*

Be it known that I, ABNER M. WRIGHT, a citizen of the United States, residing at Chicago, in the county of Cook and State of Illinois, have invented certain new and useful Improvements in Railway Rolling-Gear; and I hereby declare the following to be a full, clear, and exact description thereof, reference being to the accompanying drawings, of which—

Figure 1:
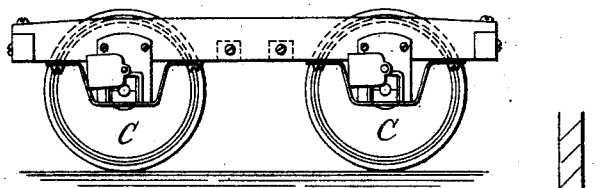
Figure 2:
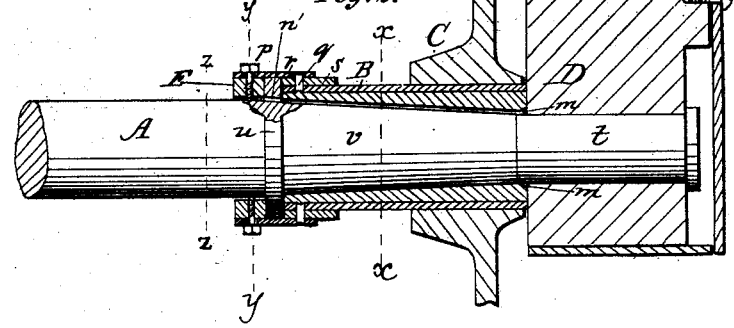
Figure 3:
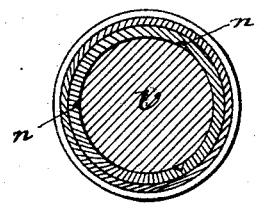
Figure 4:
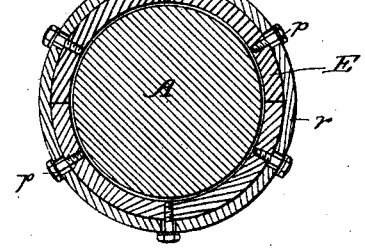
Figure 5:
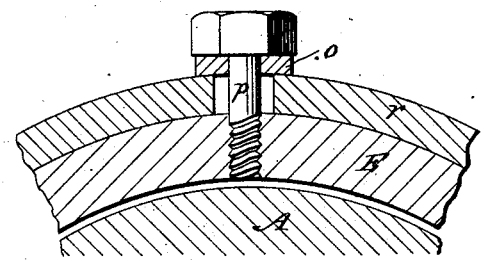
Figure 6:
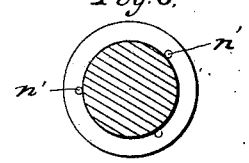

Figure 1 is a side elevation of my truck; Fig. 2, an enlarged detail view, partly section, illustrating the leading features of my invention; Fig. 3, a transverse section taken on the line $x\,x$, Fig. 2; Fig. 4, a transverse section taken on the line $y\,y$, Fig. 2; Fig. 5, an enlarged detail view; Fig. 6, a transverse section on the line $z\,z$, Fig. 2; and Fig. 7, a bottom view of a truck with the wheels alternately fixed and loose on revolving axles.

My invention relates to the construction of the wheel-hub and axle, together with a novel contrivance for attaching the former to the latter.

The objects which I aim to accomplish by means of my improvement are to attain strength, durability, evenness of action, freedom from unequal wear, and also to prevent loss of speed and waste of power through friction in the turning of curves. Numerous attempts have heretofore been made in this last direction with more or less success; but the obstacles to overcome have proved very great, and all devices hitherto contrived have upon a full trial, under all the varying surroundings and conditions which present themselves, proved defective in one or more particulars. I adopt the well-known expedient of a loose and a fixed wheel upon each axle, whereby the revolutions of the opposite wheels are rendered wholly independent; but the chief peculiarity of my device, aside from all particular details of construction, lies in the fact that the opposite wheels upon each axle are provided with means for securing them which are in all respects alike, and are adapted either to leave the wheel loose upon the axle and free to revolve independently or to lock it firmly, whereby it can revolve only with the axle, to the end that the said wheels may be alternately and interchangeably locked or left loose, as circumstances shall require. By the term locking the wheels "alternately" to the axle I mean that with a four-wheeled truck I employ on each side a fixed wheel upon one axle and a loose wheel upon the other; and that with a six-wheeled truck I employ two loose wheels and one fixed one on one side and two fixed ones and one loose one on the other. By the term locking the wheels "interchangeably" I mean the transferring of the locking from any one wheel to the opposite one upon the same axle, whereby those wheels which were before loose become fixed, and vice versa. I regard this as a highly important function, for by means of it the wear may easily be distributed and equalized; and it further permits the securing at will to either side whatever advantage may arise from the use of one or more loose or fixed wheels on that side, as the case may be.

The subordinate details of construction by means of which I carry into effect the objects above recited, and in which my invention further consists, may be briefly classed under four heads, as follows: first, the conical axle and the prolonged hub projecting slightly beyond the wheel on the outside of the same and abutting against the outside of the inner wall of the journal-box, and having its interior formed of anti-friction metal funnel-shaped to coincide with the axle, the purpose of which construction is to counteract the inward pressure and consequent lateral wear resulting from the beveled tire-tread in common use; secondly, in the device by which the said hub is secured to the axle; thirdly, in the device by which the wheel is locked at will; and, fourthly, in the means for lubrication, all as hereinafter more fully set forth.

Referring to the drawings, A is the axle, adapted to revolve in the truck, and made conical where it forms the wheel-seat, as represented at $v$. For reasons given above, the bevel of this seat should approximate as nearly as practicable to that of the tread of the tire. At the inner end of its conical portion the axle is provided with a ring-flange, $u$, forged, shrunk, or otherwise permanently attached to it; and this flange may be faced on one or both sides with anti-friction metal. The part $t$, which rests and revolves in the journal-box, is cylindrical, as usual.

B is the hub, which I prefer to make in the form of a separate cylinder, of cast or wrought iron, driven through the central opening of the wheel C, as represented in the drawings, although it may, if desired, be cast with the wheel. It projects slightly beyond the wheel in the direction of the journal-box, against which it abuts, and on the opposite side it extends to the ring-flange $u$.

D is a lining of anti-friction metal, (brass, cast-iron, or Babbitt metal, for example,) which is inserted in the usual manner, and is made thickest at the outer end, whereby the interior of the hub is funnel-shaped to coincide with the conical seat $v$, as shown. With a cast-iron hub this lining may be omitted, if desired. At its end adjacent to the ring-flange $u$ it is provided with a collar, $s$, shrunk upon it or otherwise firmly fitted to it, and made of sufficient thickness to lie with its upper face flush with that of the ring-flange. A second collar, $r$, is similarly fitted upon the collar $s$, and projects inward beyond the ring-flange $u$. To give the greatest possible firmness to these collars, they may be additionally secured by means of rivets $q$.

E is a collar, made in two sections, and adapted to fit loosely upon the axle under the projecting portion of the collar $r$. The object of forming it in two parts is to permit to be adjusted in position upon the axle, and it may, if necessary, be faced inwardly with any anti-friction metal. To this collar E, which lies close against the ring-flange $u$, the collar $r$ is rigidly secured by means of a series of set-screws, $p$, and the hub is thus held securely against all lateral movement toward the box.

The hub may, if preferred, (especially if, instead of being driven through the wheel, it is cast with it,) be made of sufficient thickness to lie flush with the upper face of the ring-flange, whereby the collar $s$ may be dispensed with.

As before stated, one of the objects of my invention is to permit the wheel to be either loose or rigid upon the axle, as circumstances shall require, and this I accomplish by means of the device most clearly represented in Fig. 5, a description of which is as follows:

The set-screws $p$ are each made of a length greater than the combined thickness of the collars $r$ and E, through which they pass, and are provided with washers $o$. When it is desired to set the wheel rigidly the washers are left off and the screws driven hard upon the axle, as represented in Fig. 2, which causes them to hold firmly by friction, and thus prevents the wheel from revolving, except with the axle. When, on the other hand, it is desired to set the wheel loosely, the washers are placed in position as represented in Fig. 5, when they serve to hold the screws out of contact with the axle, and thus leave the wheel free to revolve independently.

It is necessary to have the conical wheel-seat lubricated from the journal-box throughout its entire length; and this I effect by forming several V-shaped longitudinal channels, $n$, in the inner face of the soft-metal lining of the hub, and extending from end to end thereof. The oil from the journal-box is continually carried through these channels by the joint action of centrifugal force and capillary attraction, thus keeping the parts constantly and thoroughly lubricated. In order that the oil from the journal-box may pass freely into the channels $n$, and not be carried off in too great quantity by capillary attraction between the box and end of the hub, I prefer to chamfer the inner end of the hub slightly at that point, as shown at $m$. Channels $n'$, formed through the ring-flange $u$ at its base, as represented in Fig. 6, permit the oil to pass through to the parts beyond.

By reason of the foregoing construction the wheel is given unusual strength and evenness of action, the prolonged hub extending beyond the wheel in the direction of the journal-box and fitting upon the conical seat in the manner described, whereby its lateral play is restrained, all tending toward these ends. Moreover, my device does not involve the making of the wheel-seat any larger than the rest of the axle, and therefore the hub and its attendant parts may all be made of the proportions best calculated to give them the requisite strength and to afford the least friction.

What I claim as new, and desire to secure by Letters Patent, is—

1. In a car-truck having revolving axles, the combination, with said axles, of wheels adapted to revolve independently thereon, and mechanism whereby said wheels may be alternately and interchangeably locked, substantially as and for the purpose set forth.

2. In combination with the conical wheel-seat $v$ of the axle and with the wheel C, the prolonged hub B, projecting beyond the wheel on the outside of the same and abutting against the exterior surface of the inner wall of the journal-box, and having the anti-friction lining D made funnel-shaped to correspond with the conical seat, and mechanism for securing said hub in position upon the axle, substantially as described.

3. In combination with the axle A and wheel-hub B, the ring-flange $u$ upon said axle, collar $s$ upon the hub projecting over said ring-flange, collar E, and set-screws $p$, the whole being constructed and arranged substantially as described.

4. In combination with the axle A, ring-flange $u$ thereon, wheel-hub B, collar $s$ on said hub, projecting over the ring-flange, collar E, and set-screws $p$, the washers $o$, whereby the wheel may be set either loosely or rigidly upon the axle, as set forth.

5. A car-wheel hub grooved longitudinally on its inner surface, substantially as described, and for the purpose set forth.

6. In combination with the axle and journal-box of a car-truck, the wheel-hub abutting against said journal-box and grooved longitudinally on its inner surface, and the ring-flange $u$ upon said axle, having oil-passages through it, substantially as described, and for the purpose set forth.

7. In a car-truck, the loose axle A, made conical where it forms the wheel-seat and cylindrical where it enters the journal-box, in combination with the prolonged hub B of the wheel, abutting at its outer end against the journal-box, and having the anti-friction lining D, made funnel-shaped to coincide with the wheel-seat, and channeled longitudinally on its inner surface and chamfered at its outer end, as shown at $m$, and with mechanism for securing the said hub to the axle, substantially as described.

8. In a car-truck, the combination, with revolving axles, of one or more fixed and one or more loose wheels on each side of the truck, each axle having a fixed wheel on one end and a loose wheel on the other, substantially as described.

ABNER M. WRIGHT.

In presence of—
P. C. DYRENFORTH,
LAWRENCE NEWMAN.